(12) United States Patent
Takahashi et al.

(10) Patent No.: US 7,784,445 B2
(45) Date of Patent: Aug. 31, 2010

(54) CONTROL UNIT FOR INTERNAL COMBUSTION ENGINE

(75) Inventors: Nobuyuki Takahashi, Hitachinaka (JP);
Masahiro Sasaki, Hitachinaka (JP);
Takuya Mayuzumi, Hitachinaka (JP);
Mitsuhiko Watanabe, Odawara (JP);
Ryoichi Oura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 12/257,074

(22) Filed: Oct. 23, 2008

(65) Prior Publication Data

US 2009/0107469 A1 Apr. 30, 2009

(30) Foreign Application Priority Data

Oct. 26, 2007 (JP) ............................. 2007-278772

(51) Int. Cl.
*F02M 51/00* (2006.01)
(52) U.S. Cl. .................. 123/479; 123/490; 361/154
(58) Field of Classification Search ................. 123/479, 123/490; 361/154
See application file for complete search history.

(56) References Cited

U.S. PATENT DOCUMENTS

| | | | | |
|---|---|---|---|---|
| 5,195,011 A | * | 3/1993 | Giorgetta et al. ............... 361/87 |
| 6,123,058 A | * | 9/2000 | Endou ........................ 123/490 |
| 6,250,286 B1 | * | 6/2001 | Hoenig et al. ................ 123/490 |
| 6,367,719 B1 | * | 4/2002 | Wright ..................... 239/585.1 |
| 6,526,945 B2 | * | 3/2003 | Herzog et al. ............... 123/490 |
| 6,634,338 B1 | * | 10/2003 | Yamakado et al. ........... 123/490 |
| 7,117,852 B2 | * | 10/2006 | Santero et al. ............... 123/490 |
| 7,546,830 B2 | * | 6/2009 | Nagase et al. ............... 123/490 |
| 7,621,259 B2 | * | 11/2009 | Mayuzumi ................... 123/490 |
| 2005/0126542 A1 | * | 6/2005 | Oono ......................... 123/479 |

FOREIGN PATENT DOCUMENTS

JP 2003-27994 A 1/2003
JP 2004-124890 A 4/2004

\* cited by examiner

*Primary Examiner*—Erick Solis
(74) *Attorney, Agent, or Firm*—Crowell & Moring LLP

(57) ABSTRACT

There is proposed a control unit for an internal combustion engine, which comprises a boost circuit, a switching element, a current detecting resistor and a controller and is designed to be actuated such that the boost circuit is used to boost a power source voltage to create a boosted voltage and the controller is used to control the switching element so as to enable the boosted voltage to flow to the injector solenoid coil. This control unit is designed such that, when the boost circuit goes out of order, the injector solenoid coil is excited by making use of the power source voltage without using the boosted voltage and without creating a peak current to thereby generate a first holding current required for opening the injector and a second holding current required for retaining the opened state of the injector, the second holding current being lower in intensity than the first holding current.

7 Claims, 14 Drawing Sheets

CONTROL UNIT FOR INTERNAL COMBUSTION ENGINE

BACKGROUND OF THE INVENTION

1. Field of the Invention

The present invention relates to a control unit for an internal combustion engine of automobiles. In particular, the present invention relates to a control unit for an internal combustion engine, which is equipped with means which is capable of driving an injector of automobile in such a manner that even if the boost circuit in the injector-driving circuit of the control unit goes out of order, the injector is enabled to be stably driven while leaving the circuit structure as it is.

2. Description of the Related Art

With respect to the injector-driving circuit for automobiles, the one described in JP Published Patent Application No. 2003-27994 A has been conventionally known, wherein a valve-opening current control circuit is actuated to transmit an electric current needed for opening the valve to the injector and then a switching element is turned OFF to enable the electric current to moderately fall, after which the switching element is brought into a state of Half-ON by making use of a steep fall control circuit of downstream side and then the electric current is switched to holding current.

Further, JP Published Patent Application No. 2004-124890 A discloses a fuel-feeding apparatus for an engine, wherein the supply of electric current to a solenoid is performed at the time when the theoretical product between a valve-opening signal and a holding signal is materialized, and if the time required for enabling the valve-opening current to reach a predetermined current level counted from the start of the fuel injection pulse is shorter than a predetermined time period, a fuel injection system is judged as being abnormal.

FIG. 1 illustrates a circuit diagram of the driving circuit (for one cylinder) of solenoid coil for the injector in the conventional control unit for an internal combustion engine. This circuit consists of two sections, i.e. one of which being a boost circuit which is constituted by an injector controller 5, a boost coil 1, a diode 2, a switching MOSFET 3, an electrolytic capacitor 4 and a current detecting resistor 6; and the other being an injector driving circuit which is constituted by an injector controller 5, a peak current MOSFET 7, a holding current MOSFET 8, a downstream side MOSFET 11, a reverse current-preventing diode 9, a flywheel diode 12, an injector solenoid coil 10 and a current-detecting resistor 13.

When the driving signals shown at the second, third and fourth rows of FIG. 2 are applied to the peak current MOSFET 7, the holding current MOSFET 8, the downstream side MOSFET 11, respectively, the intensity of current flowing to the injector solenoid coil 10 is monitored by the current-detecting resistor 13 shown in FIG. 1 and then the current intensity thus monitored is fed back to the injector controller 5, thereby enabling an injector current 10-A shown at the first row of FIG. 2 to flow to the injector solenoid coil 10.

In the case of this circuit configuration, there is a problem that if the electrolytic capacitor 4 of boost circuit goes out of order due to the GND short-circuit, the electric current from the holding current MOSFET 8 is caused to backflow to the peak current MOSFET 7, thereby making it impossible to enable electric current to flow to the injector solenoid coil 10 and hence making it impossible to actuate the injector.

Further, when it is judged that the boost circuit has gone out of order, the driving signals shown at the second, third and fourth rows of FIG. 3 are applied to the peak current MOSFET 7, the holding current MOSFET 8, the downstream side MOSFET 11, respectively, thereby making it possible to create a current waveform shown at the first row of FIG. 3. However, there is a problem that in the case of the waveform shown in FIG. 3, since it is constant in current waveform, a maximum current needed for opening the injector is caused to flow all over the entire current conducting region, resulting in an increased heating of the driving circuit, thereby greatly restricting the upper limit of the engine speed.

Furthermore, in the case of this circuit configuration, there is also a problem that although it may be possible, with the addition of Zener diode, to perform a steep fall of electric current, it will lead to a great heat build-up due to the provision of Zener diode, thereby necessitating further restriction of the upper limit of the engine speed.

SUMMARY OF THE INVENTION

The present invention has been made to overcome the problems mentioned above and, therefore, according to the present invention, there is provided a control unit for an internal combustion engine, which comprises a boost circuit, a switching element, a current detecting resistor and a controller and is designed to be actuated such that the boost circuit is used to boost a power source voltage to create a boosted voltage and the controller is used to control the switching element so as to enable the boosted voltage to flow to the injector solenoid coil, wherein the control unit is characterized in that, when the boost circuit goes out of order, the injector solenoid coil is excited by making use of the power source voltage without using the boosted voltage and without creating a peak current to thereby generate a first holding current required for opening the injector and a second holding current required for retaining the opened state of the injector, the second holding current being lower in intensity than the first holding current.

The above-described control unit for an internal combustion engine according to the present invention may be constructed such that it is provided with a current channel for enabling the boost circuit to communicate, via a switching element for peak current and a reverse current-preventing diode, with the injector solenoid coil, and with a current channel, which is disposed parallel with the first-mentioned current channel, for enabling a power source to communicate, via a switching element for holding current and the reverse current-preventing diode, with the injector solenoid coil, thereby creating a current channel for enabling the power source voltage to be directly transmitted to the injector solenoid coil.

The above-described control unit for an internal combustion engine according to the present invention may be constructed such that a downstream side switching element and the current detecting resistor are successively disposed on the downstream side of the injector solenoid coil and, additionally, a flywheel diode is located between the downstream side of the current detecting resistor and the upstream side of the injector solenoid coil, wherein the electric current flowing into the injector solenoid coil is monitored as the electric current falls by making use of the flywheel diode and the downstream side switching element is shut down at a threshold level of the electric current immediately before the fall of the electric current becomes zero.

According to another aspect of the present invention, there is further provided a control unit for an internal combustion engine, which comprises a boost circuit, a switching element, a current detecting resistor and a controller and is designed to be actuated such that the boost circuit is used to boost a power source voltage to create a boosted voltage and the controller is used to control the switching element so as to enable the boosted voltage to flow to the injector solenoid coil, wherein the control unit is characterized in that, when the boost circuit goes out of order, the injector solenoid coil is excited by making use of the power source voltage without using the boosted voltage and without creating a peak current to thereby generate a pre-charge current for promoting the opening of the injector, a first holding current required for opening the injector and a second holding current required for retaining the opened state of the injector, the second holding current being lower in intensity than the first holding current.

In the last-mentioned control unit for an internal combustion engine according to the present invention may be constructed such that it is provided with a current channel for enabling the boost circuit to communicate, via a switching element for peak current and a reverse current-preventing diode, with the injector solenoid coil, and with a current channel, which is disposed parallel with the first-mentioned current channel, for enabling a power source to communicate, via a switching element for holding current and the reverse current-preventing diode, with the injector solenoid coil, thereby creating a current channel for enabling the power source voltage to be directly transmitted to the injector solenoid coil.

Further, the last-mentioned control unit for an internal combustion engine according to the present invention may be constructed such that a downstream side switching element and the current detecting resistor are successively disposed on the downstream side of the injector solenoid coil and, additionally, a flywheel diode is located between the downstream side of the current detecting resistor and the upstream side of the injector solenoid coil, wherein the electric current flowing into the injector solenoid coil is monitored as the electric current falls by making use of the flywheel diode and the downstream side switching element is shut down at a threshold level of the electric current immediately before the fall of the electric current becomes zero.

Alternatively, the control unit for an internal combustion engine according to the present invention may be constructed such that when a waiting time for the fall of electric current is prolonged, the downstream side switching element is shut down timely before the fall of electric current overlaps with the rise of electric current flowing into the injector solenoid coil of a counter cylinder.

According to the control unit for an internal combustion engine which is designed to actuate the injector as set forth in claim 1 or 2, when the boost circuit goes out of order, the injector solenoid coil is excited by making use of the power source voltage without using the boosted voltage, thereby enabling to generate a first holding current required for opening the injector and a second holding current which is lower in intensity than the first holding current and required for retaining the opened state of the injector. As a result, it is now possible to secure the fail-safe function that the injector can be actuated even when the boost circuit goes out of order. Additionally, since the second holding current for retaining the opened state of the injector is made lower in intensity than the first holding current, it is now possible to inhibit the build-up of heat in the driving circuit as compared with the case where the injector current is kept constant in intensity.

Further, according to the invention set forth in claim 3 or 6, since it is designed such that when the boost circuit goes out of order, the electric current flowing into the injector solenoid coil is monitored as the injector-driving current falls and then the electric current thus monitored is fed back to the drive controller so as to enable the downstream side switching element to shut down at a threshold level of the electric current immediately before the fall of the electric current becomes zero. As a result, it is now possible to prevent regenerative current from flowing toward the boost circuit and hence to prevent the further deterioration of the damage of the boost circuit.

Further, according to the invention set forth in claim 4 or 5, due to the provision of the fail-safe function that the injector can be actuated even when the boost circuit goes out of order, due to the suppression of heat build-up in the driving circuit through the employment of the second holding current of lower intensity than that of the first holding current for retaining the opened state of the injector, and due to the employment of the pre-charge current, it is now possible to improve the responding properties for opening the injector without necessitating the employment of the boost circuit, thereby making it possible to achieve the high-precision control of the injector.

Further, according to the invention set forth in claim 7, it is possible to prevent the mutual intervention among the cylinders of the internal combustion engine, thus making it possible to realize the stable control of the engine.

DESCRIPTION OF THE PREFERRED EMBODIMENTS

Next, specific embodiments representing preferred embodiments for carrying out the present invention will be explained in detail with reference to drawings.

Embodiment 1

Figure 4:
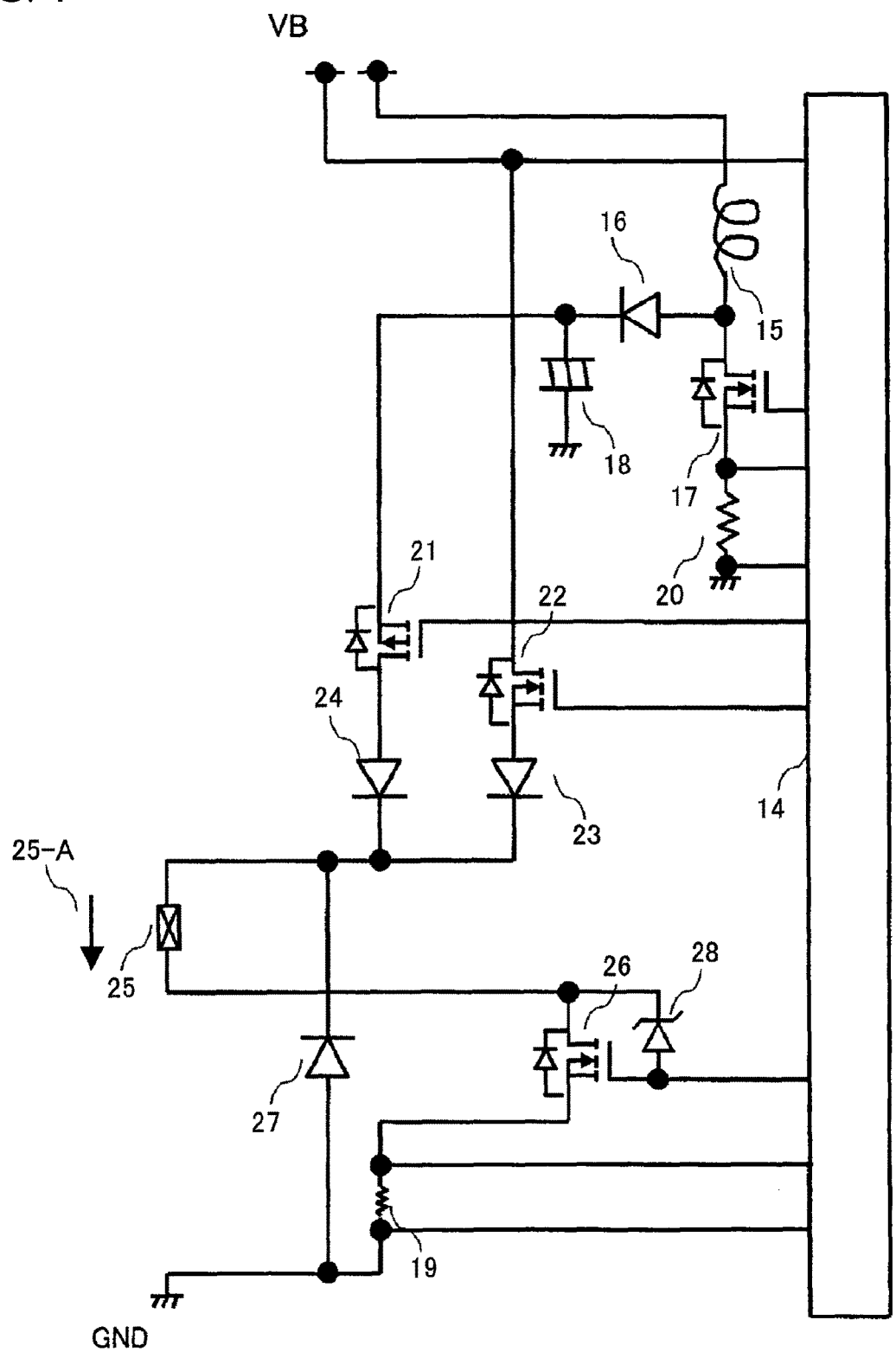
FIG. 4 is a circuit diagram of the injector driving circuit (for one cylinder) according to Embodiment 1 of the present invention.

FIG. 4 shows a circuit diagram of Embodiment 1 of the present invention. In this circuit, a boost circuit is constituted by an injector controller 14, a boost coil 15, a diode 16, a switching MOSFET 17, an electrolytic capacitor 18 and a current detecting resistor 20. This boost circuit is designed to boost a battery voltage VB which is supplied from an external component. A high voltage VH that has been boosted by the boost coil 15 is applied to the upstream side of a peak current MOSFET 21 and the downstream side of this MOSFET 21 is connected with the anode side of a reverse current-preventing diode 24. The cathode side of the reverse current-preventing diode 24 is connected with an injector solenoid coil 25.

To the upstream side of a holding current MOSFET 22 is applied a battery voltage VB which is supplied from an external component and the downstream side of the holding current MOSFET 22 is connected with the anode side of a reverse current-preventing diode 23. The cathode side of the reverse current-preventing diode 23 is connected with the injector solenoid coil 25. The downstream side of the injector solenoid coil 25 is connected with the upstream side of the downstream side MOSFET 26 and the downstream side of this MOSFET 26 is connected with a current-detecting resistor 19. The anode side of a flywheel diode 27 is connected with GND and the cathode side thereof is connected with the cathode sides of the reverse current-preventing diodes 23 and 24.

Figure 5:
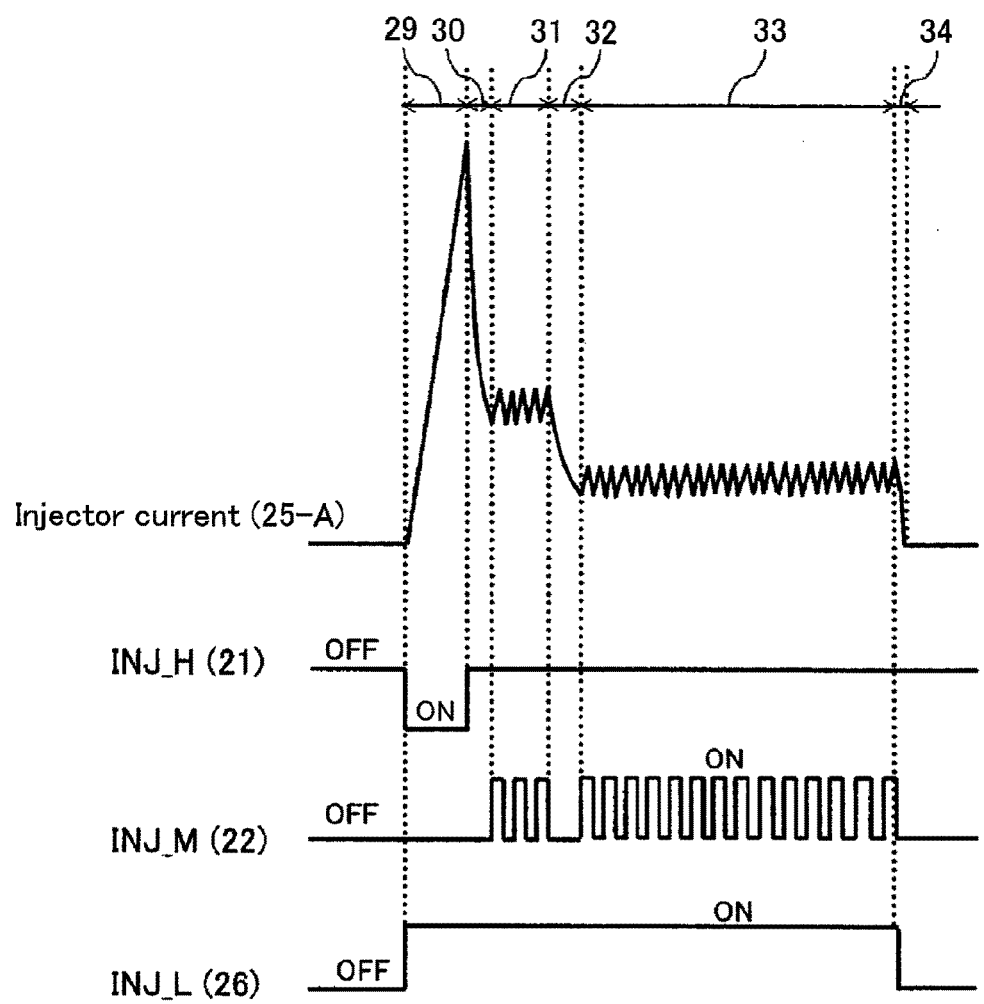
FIG. 5 is a diagram illustrating the input voltage waveform and the injector current waveform (during the normal operation) in the injector driving circuit (for one cylinder) according to Embodiment 1 of the present invention.

When the driving signals shown at the second, third and fourth rows of FIG. 5 are applied to the peak current MOSFET 21, the holding current MOSFET 22, the downstream side MOSFET 26, respectively, the intensity of current flowing to the injector solenoid coil 25 is monitored by the current-detecting resistor 19 and then the current intensity thus monitored is fed back to the injector controller 14 to control the electric current. As a result, an electric current constituted by a peak current for opening the injector, a first holding current which is needed for keeping the open state of the injector, and a second holding current needed for suppressing the heat build-up is permitted flow to the injector solenoid coil 25.

When an abnormal intensity of the electric current flowing to the injector solenoid coil 25 is detected by the injector controller 14 through the monitoring by means of the current-detecting resistor 19, or when the abnormality of boosted voltage that has been detected by the injector controller 14 is not amended even after the elapse of a predetermined period of time, the boost circuit is judged as gone out of order. In this case, since a peak current is to be formed by making use of the boost circuit at the peak current rise period 29 shown in FIG. 5, it is no longer possible to create the current waveform shown at the first row of FIG. 5 due to this failure of the boost circuit.

Figure 6:
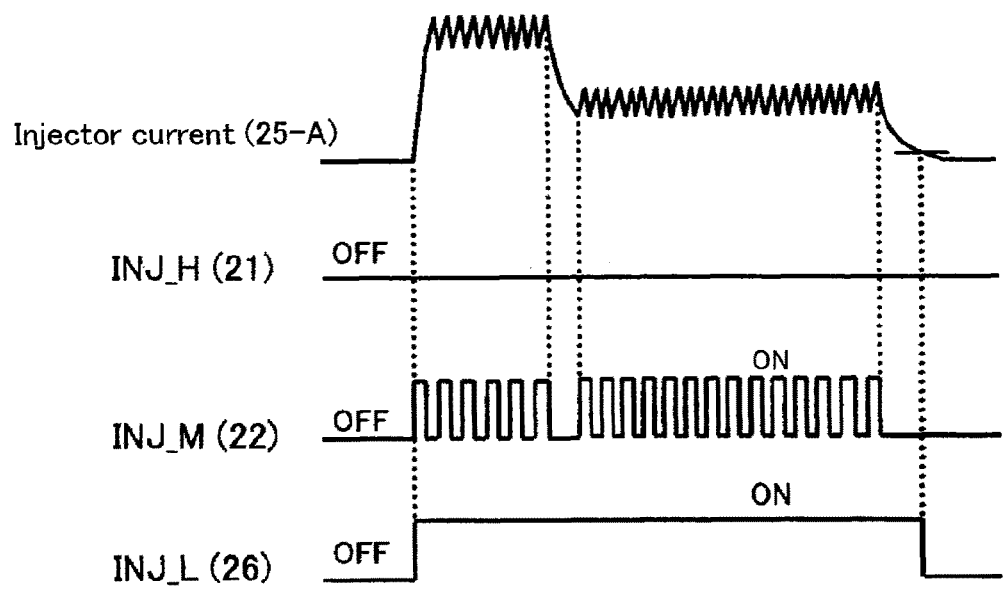
FIG. 6 is a diagram illustrating the input voltage waveform and the injector current waveform during the failure of the boost circuit in the injector driving circuit (for one cylinder) according to Embodiment 1 of the present invention.

Therefore, the driving signals to be applied to the MOSFETs 21, 22 and 26 are changed to the waveforms shown at the second, the third and the fourth rows of FIG. 6, respectively, thereby changing it to the injector current shown at the first row of FIG. 6. In this case, in different to the conventional circuit, since the power source to be supplied to the peak current MOSFET 21 and to the holding current MOSFET 22 is divided and the reverse current-preventing diodes 23 and 24 are additionally incorporated, it is possible, even if the boost circuit has gone out of order, to supply electric current from the power source to the holding current MOSFET 22, thereby making it possible to create the current waveform shown at the first row of FIG. 6. As a result, it is possible to flow electric current to the injector solenoid coil 25 and hence to actuate the injector.

Figure 1:
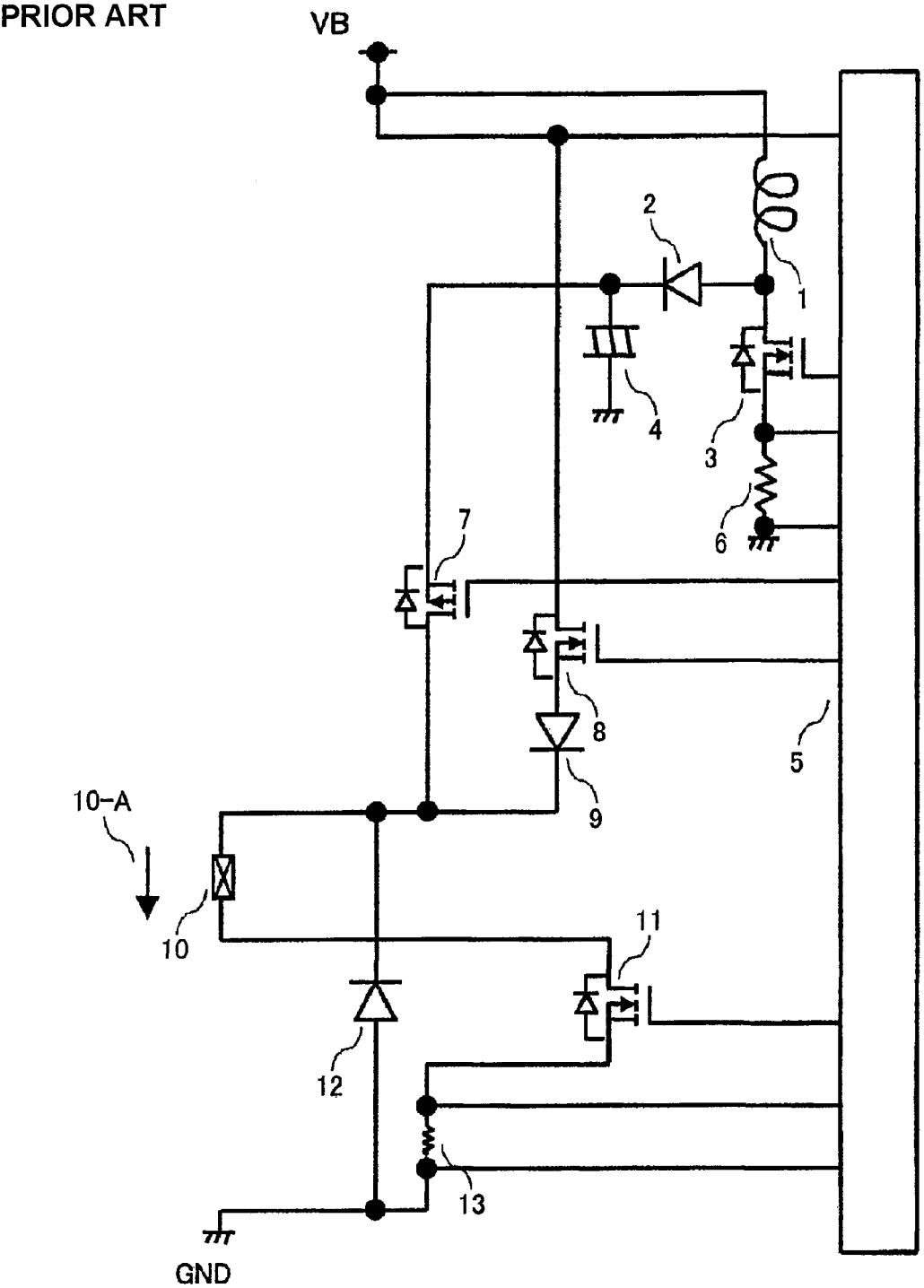
FIG. 1 is a circuit diagram of the driving circuit (for one cylinder) of solenoid coil for the injector in the conventional control unit for an internal combustion engine.
Figure 2:
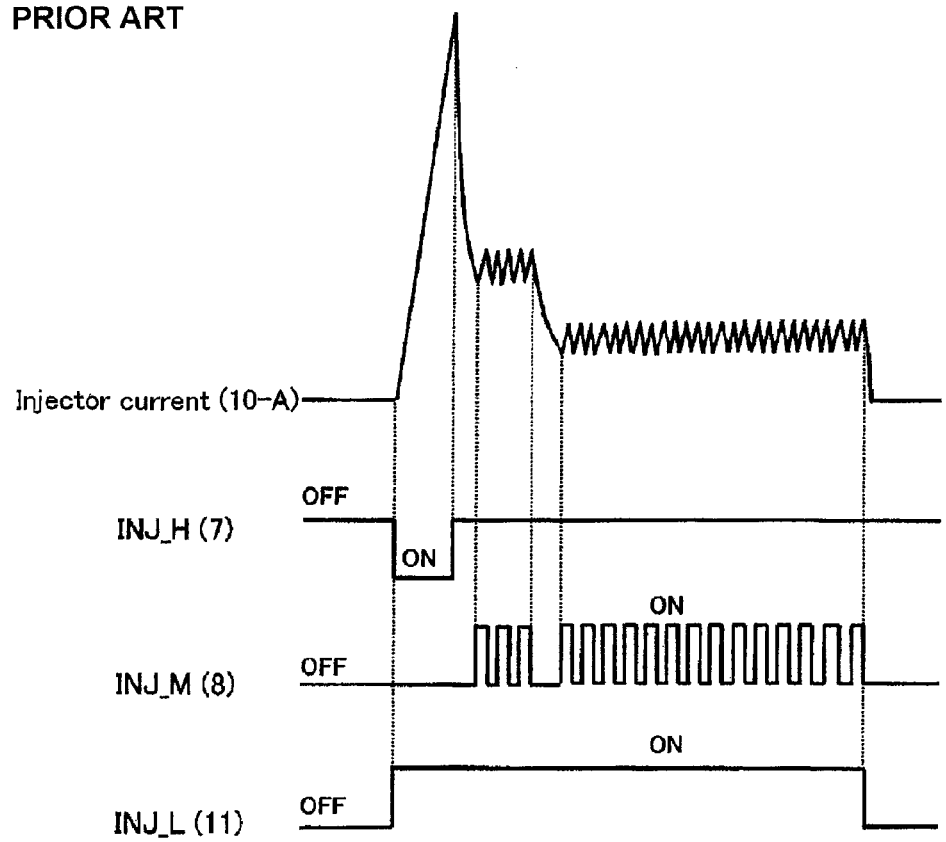
FIG. 2 is a diagram illustrating the input voltage waveform and the injector current waveform in the driving circuit of solenoid coil for the injector in the conventional control unit for an internal combustion engine.
Figure 3:
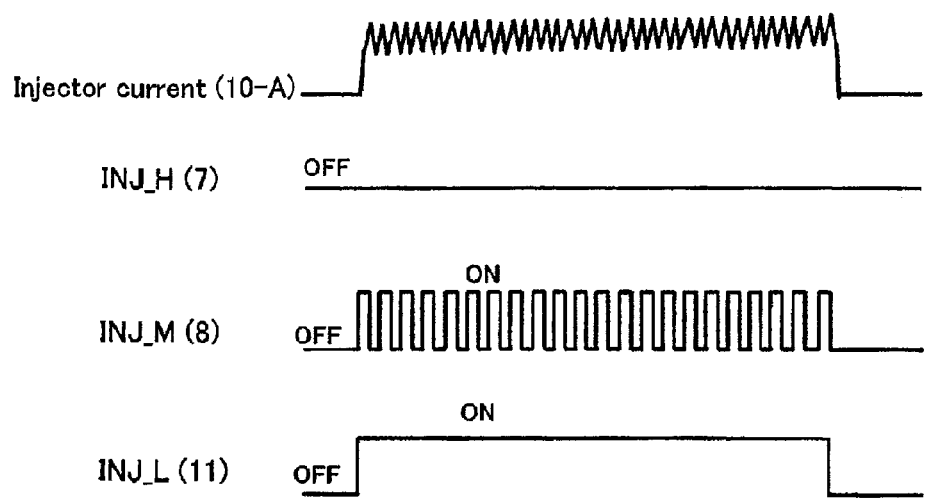
FIG. 3 is a diagram illustrating the input voltage waveform and the injector current waveform to be employed as the boost circuit has gone out of order in the driving circuit of solenoid coil for the injector in the conventional control unit for an internal combustion engine.

In the case of the current waveform shown in FIG. 6, which is consisted of two steps with no peak current, it is possible to avoid not only the increase of heat build-up of the driving circuit but also great restriction on the upper limit of the engine speed, that may result from a constant current waveform shown in FIG. 3.

Further, when both of the peak current MOSFET 21 and the holding current MOSFET 22 are turned OFF and the downstream side MOSFET 26 is turned ON, the energy of electric current flowing to the injector solenoid coil 25 is enabled to be consumed by the flywheel diode 27, so that the boost circuit is no longer required to be used.

Furthermore, since it is designed such that the electric current flowing into the injector solenoid coil 25 is monitored as the electric current falls and then the downstream side MOSFET 26 is turned OFF at a threshold level immediately before the fall of the electric current becomes zero, it is now possible to enable a Zener diode 28 connected to a location between the drain-gate regions of the MOSFET 26 to consume the electric energy of the injector solenoid coil.

As described above, it is now possible to avoid the heat build-up of the circuit that might have been caused to develop as the boost circuit goes out of order in the prior art as shown in FIG. 3.

Embodiment 2

Figure 7:
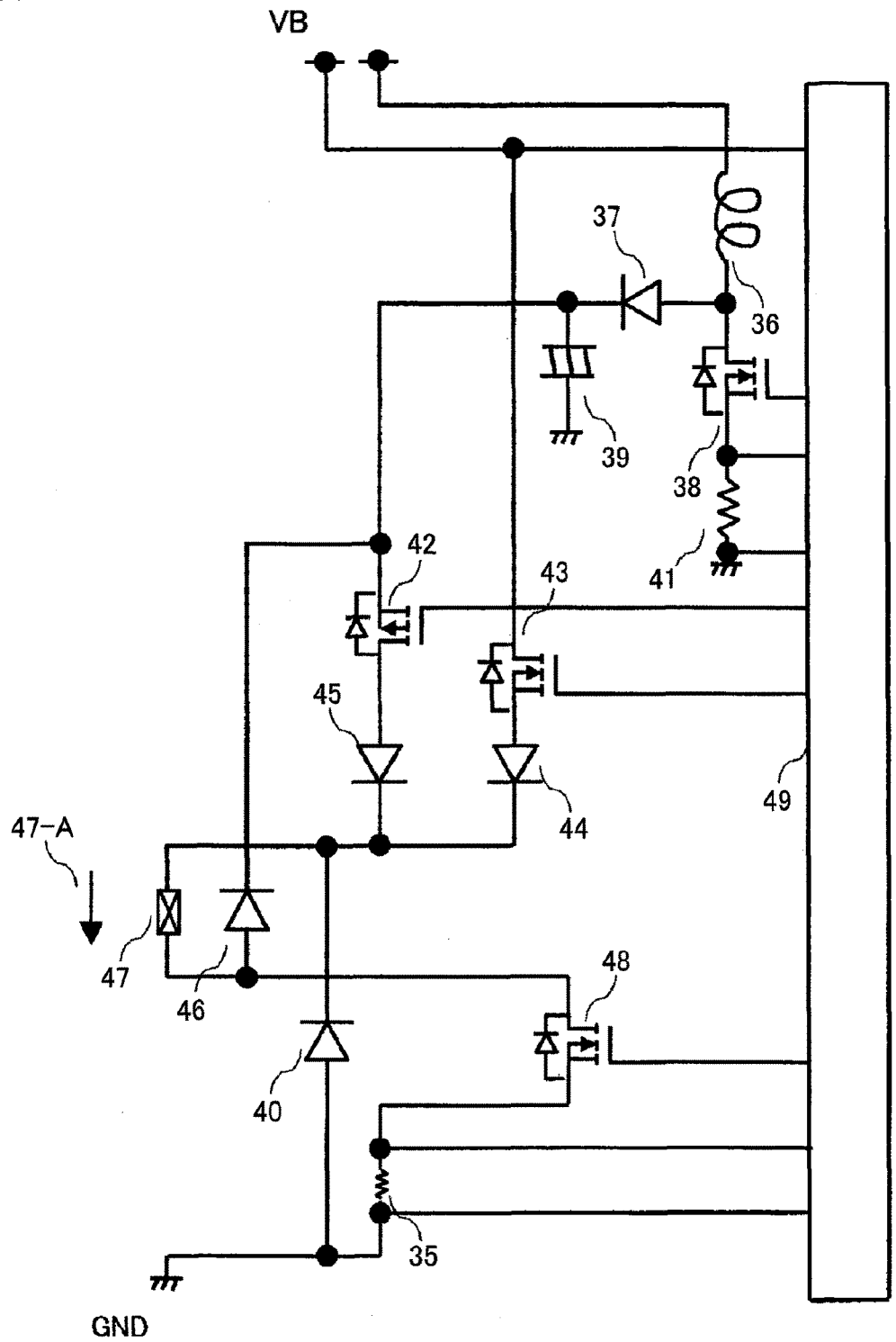
FIG. 7 is a circuit diagram of the injector driving circuit (for one cylinder) according to Embodiment 2 of the present invention.

FIG. 7 shows a circuit diagram of Embodiment 2 of the present invention. In this circuit, a boost circuit is constituted by an injector controller 49, a boost coil 36, a diode 37, a switching MOSFET 38, an electrolytic capacitor 39 and a current detecting resistor 41. This boost circuit is designed to boost a battery voltage VB to be supplied from an external component. A high voltage VH that has been boosted by the boost coil 36 is applied to the source side of a peak current MOSFET 42 and the drain side of this MOSFET 42 is connected with the anode side of a reverse current-preventing diode 45. The cathode side of the reverse current-preventing diode 45 is connected with an injector solenoid coil 47.

To the drain side of a holding current MOSFET 43 is applied a battery voltage VB which is supplied from an external component and the source side of the holding current MOSFET 43 is connected with the anode side of a reverse current-preventing diode 44. The cathode side of the reverse current-preventing diode 44 is connected with the injector solenoid coil 47. The downstream side of the injector solenoid coil 47 is connected with the drain side of a downstream side MOSFET 48 and the source side of this MOSFET 48 is connected with a current-detecting resistor 35. The anode side of a flywheel diode 40 is connected with GND and the cathode side thereof is connected with the cathode sides of the reverse current-preventing diodes 44 and 45. The cathode side of regenerating diode 46 is connected with the source side of the peak current MOSFET 42 and the anode thereof is connected with the drain side of the downstream side MOSFET 48.

Figure 8:
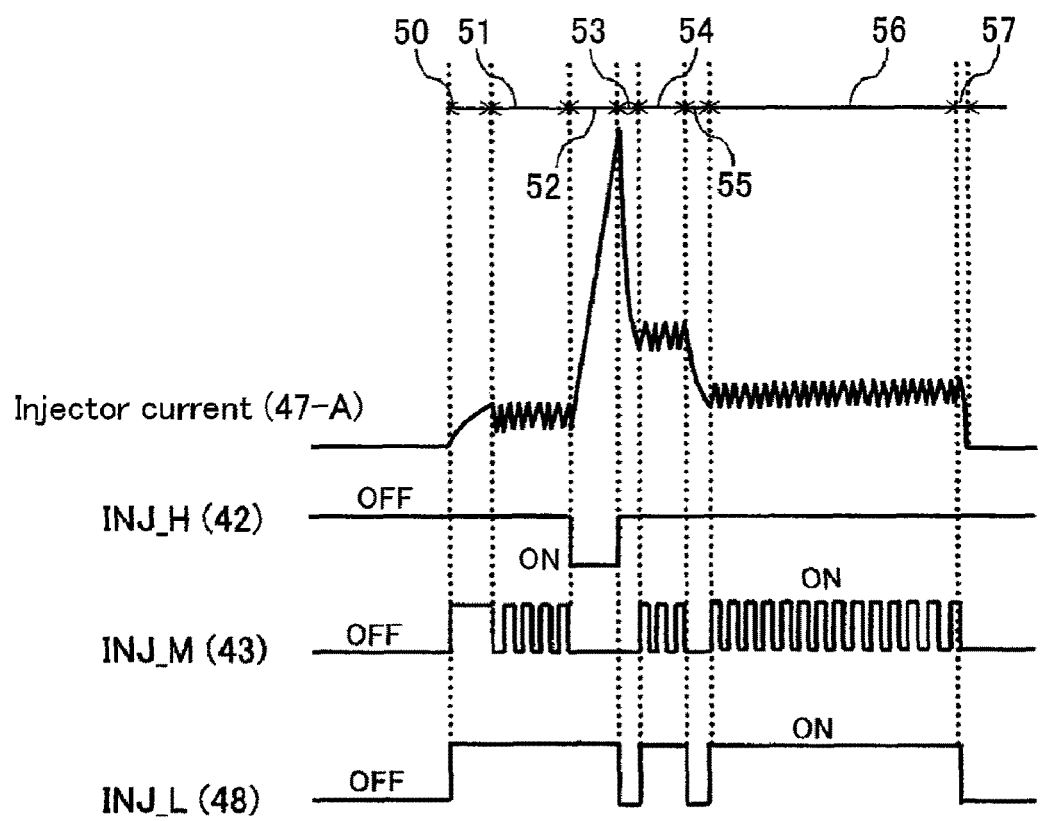
FIG. 8 is a diagram illustrating the input voltage waveform and the injector current waveform (during the normal operation) in the injector driving circuit (for one cylinder) according to Embodiment 2 of the present invention.

When the driving signals shown at the second, third and fourth rows of FIG. 8 are applied to the peak current MOSFET 42, the holding current MOSFET 43, the downstream side MOSFET 48, respectively, the intensity of current flowing to the injector solenoid coil 47 is monitored by the current-detecting resistor 35 and then the current intensity thus monitored is fed back to the injector controller 49 to control the electric current. As a result, an electric current at the first row of FIG. 8 is permitted to flow to the injector solenoid coil 47.

When an abnormal intensity of the electric current flowing to the injector solenoid coil 47 is detected by the injector controller 49 through the monitoring by means of the current-detecting resistor 35, or when the abnormality of boosted voltage that has been detected by the injector controller 49 is not amended even after the elapse of a predetermined period of time, the boost circuit is judged as gone out of order. In this case, since the current waveform shown at the first row of FIG. 8 is formed by making use of the boost circuit at the periods 52, 53, 55 and 57 shown in FIG. 8, it is no longer possible to create the current waveform shown in FIG. 8 due to this failure of the boost circuit.

Figure 9:
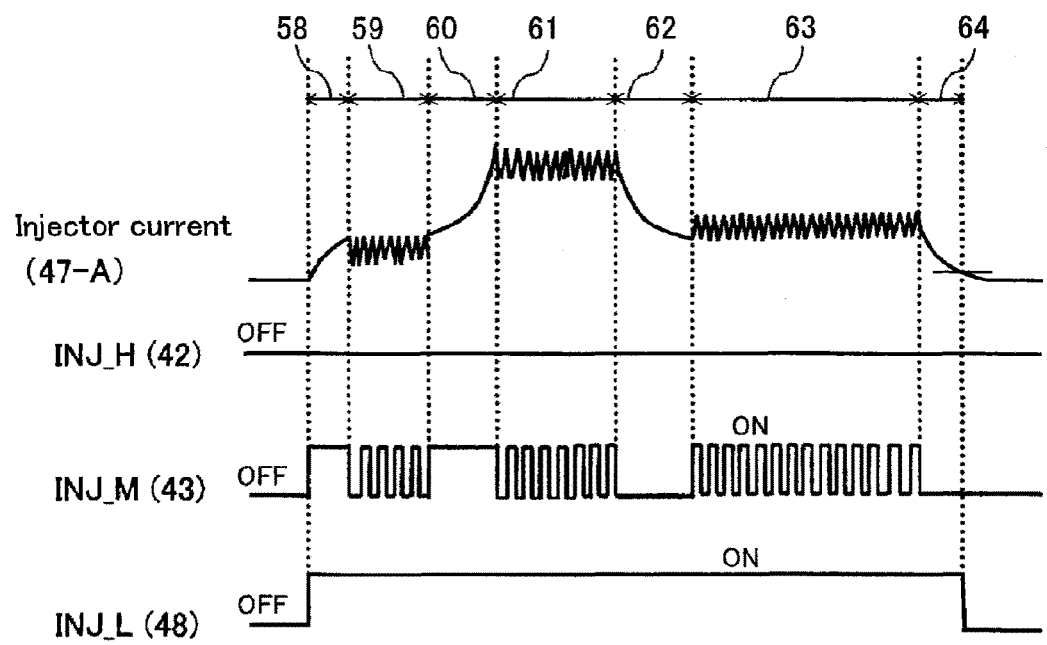
FIG. 9 is a diagram illustrating the input voltage waveform and the injector current waveform during the failure of the boost circuit in the injector driving circuit (for one cylinder) according to Embodiment 2 of the present invention.

Therefore, the driving signals to be applied to the MOSFETs 42, 43 and 48 are changed to the waveforms shown at the second, the third and the fourth rows of FIG. 9, respectively. In this case, in different to the conventional circuit, since the power source to be supplied to the peak current MOSFET 42 and to the holding current MOSFET 43 is divided and the reverse current-preventing diodes 44 and 45 are additionally incorporated, it is possible, even if the boost circuit has gone out of order, to supply electric current from the power source to the holding current MOSFET 43, thereby making it possible to create the current waveform shown at the first row of FIG. 9. As a result, it is possible to flow electric current to the injector solenoid coil 47 and hence to actuate the injector.

Further, when both of the peak current MOSFET 42 and the holding current MOSFET 43 are turned OFF and the downstream side MOSFET 48 is turned ON, the energy of electric current flowing to the injector solenoid coil 47 is enabled to be consumed by the flywheel diode 40, so that the boost circuit is no longer required to be used and regenerative current is not required to be transmitted to the boost circuit side.

Especially, during the holding current-falling period 64 and on the occasion where the circuit is out of order, it is possible to enable electric current to fall down to zero without necessitating the monitoring of current if an ordinary boost circuit is employed. However, if the boost circuit is not employed, since the downstream side MOSFET 48 is turned ON to enable the flywheel diode to consume the energy of electric current, it is required to continue the monitoring of electric current and the downstream side MOSFET 48 is turned OFF immediately before the intensity of electric current becomes zero. By doing so, it is now possible to enable the waveform of the injector current shown in the first row in FIG. 9 to change in terms of the time and the intensity of electric current of each time period. As a result, it is now possible to accelerate the injector-opening response, to realize a high-precision control and to suppress the heat build-up.

Embodiment 3

Figure 10:
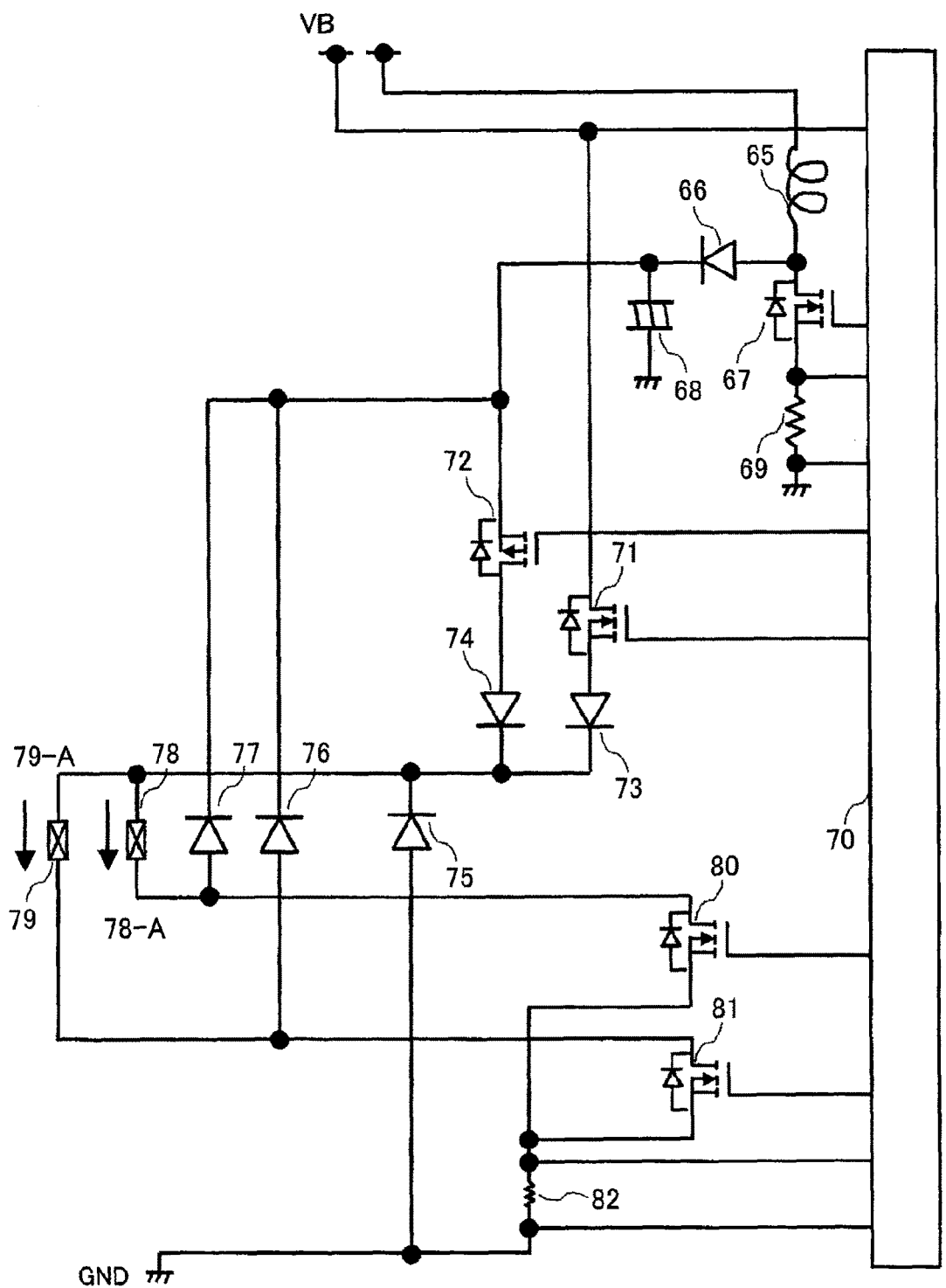
FIG. 10 is a circuit diagram of the injector driving circuit (for two cylinders) according to Embodiment 3 of the present invention.

FIG. 10 shows a circuit diagram of Embodiment 3 of the present invention. In this circuit, a boost circuit is constituted by an injector controller 70, a boost coil 65, a diode 66, a switching MOSFET 67, an electrolytic capacitor 68 and a current detecting resistor 69. This boost circuit is designed to boost a battery voltage VB which is supplied from an external component. A high voltage VH that has been boosted by the boost coil 15 is applied to the source side of a peak current MOSFET 72 and the drain side of this MOSFET 72 is connected with the anode side of a reverse current-preventing diode 74. The cathode side of the reverse current-preventing diode 74 is connected in parallel with injector solenoid coils 78 and 79.

To a holding current MOSFET 71 is applied a battery voltage VB which is supplied from an external component and the source side of the holding current MOSFET 71 is connected with the anode side of a reverse current-preventing diode 73. The cathode side of the reverse current-preventing diode 73 is connected in parallel with the injector solenoid coils 78 and 79.

The downstream sides of the injector solenoid coils 78 and 79 are connected with the drain side of the downstream side MOSFETs 80 and 81, respectively, and the source sides of these MOSFETs 80 and 81 are connected with a current-detecting resistor 82. The anode side of a flywheel diode 75 is connected with GND and the cathode side thereof is connected with the cathode sides of the reverse current-preventing diodes 73 and 74. Further, the cathode sides of regenerating diodes 76 and 77 are connected with the source side of the peak current MOSFET 72 and the anode thereof is connected with the drain sides of the downstream side MOSFETs 80 and 81.

Figure 11:
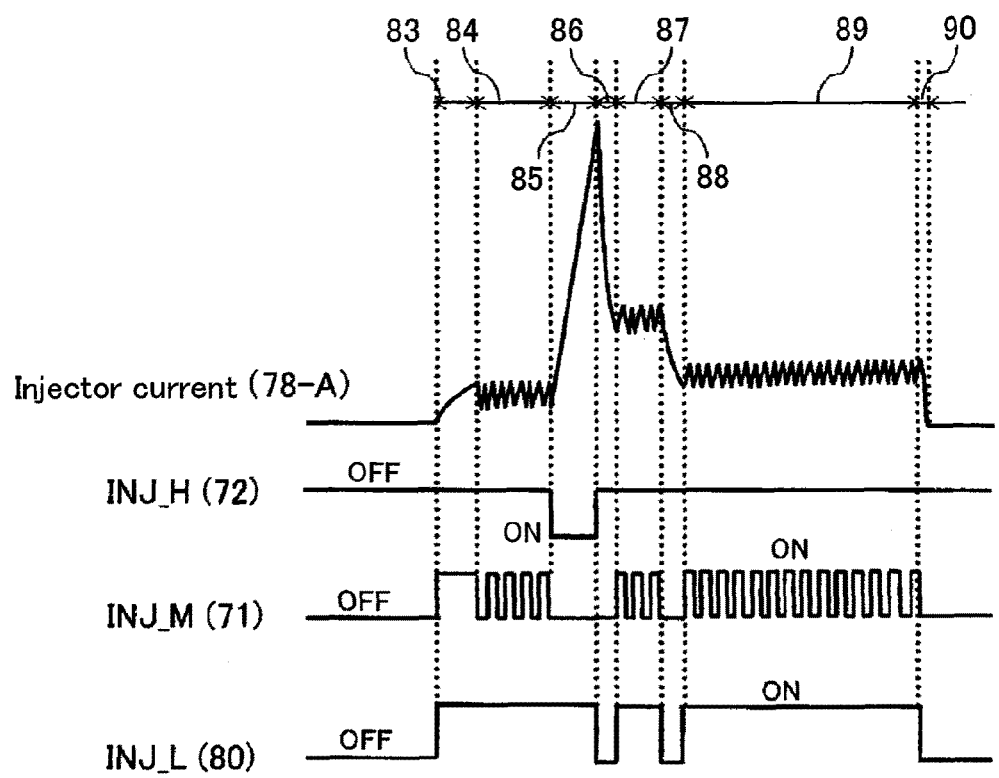
FIG. 11 is a diagram illustrating the input voltage waveform and the injector current waveform of a first cylinder (during the normal operation) in the injector driving circuit according to Embodiment 3 of the present invention.
Figure 12:
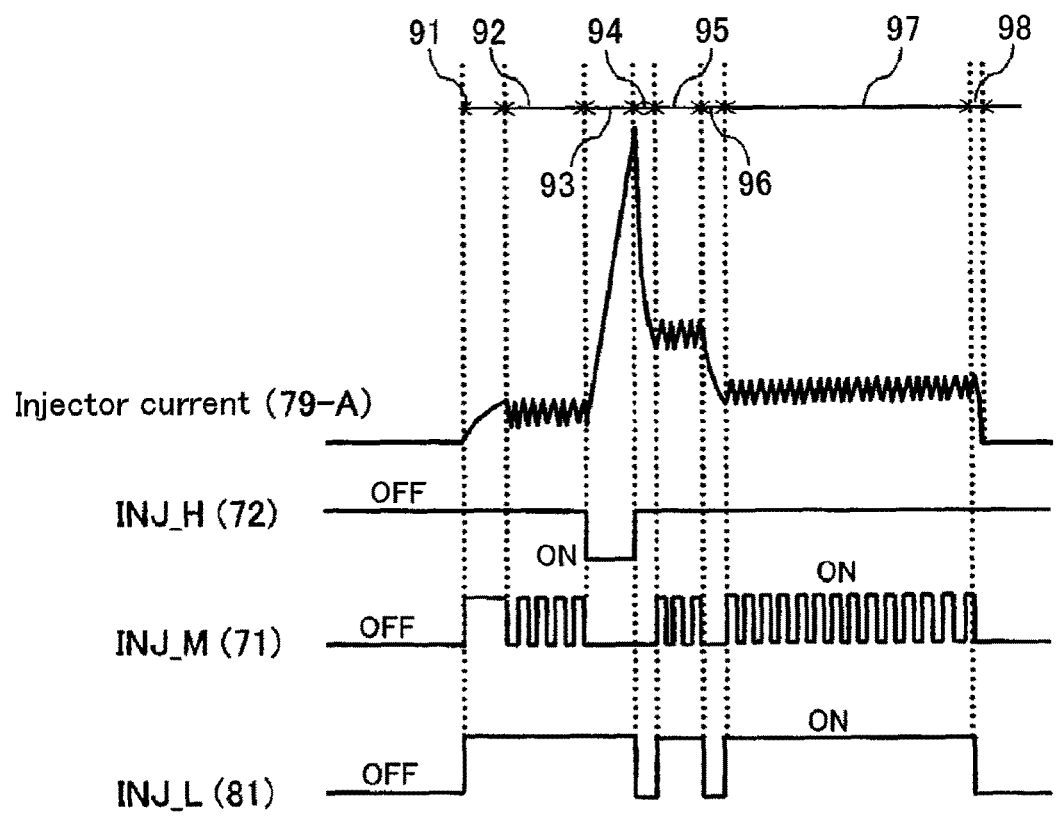
FIG. 12 is a diagram illustrating the input voltage waveform and the injector current waveform of a second cylinder (during the normal operation) in the injector driving circuit (for one cylinder) according to Embodiment 3 of the present invention.

When the driving signals shown at the second, third and fourth rows of FIG. 11 are applied to the peak current MOSFET 72, the holding current MOSFET 71, the downstream side MOSFET 80, respectively, and, successively, the driving signals shown at the second, third and fourth rows of FIG. 12 are applied to the peak current MOSFET 72, the holding current MOSFET 71, the downstream side MOSFET 80, respectively, the current intensities 78-A and 79-A of the injector solenoid coils 78 and 79 are monitored by the current-detecting resistor 82 and then the current intensities thus monitored are fed back to the injector controller 70 to control the electric current. As a result, the electric current shown at the first row in FIG. 11 is permitted flow to the injector solenoid coil 78 and then the electric current shown at the first row in FIG. 12 is permitted flow to the injector solenoid coil 79.

When an abnormal intensity of the electric current flowing to the injector solenoid coils 78 and 79 is detected by the injector controller 70 through the monitoring by means of the current-detecting resistor 82, or when the abnormality of boosted voltage that has been detected by the injector controller 70 is not amended even after the elapse of a predetermined period of time, the boost circuit is judged as gone out of order.

Figure 13:
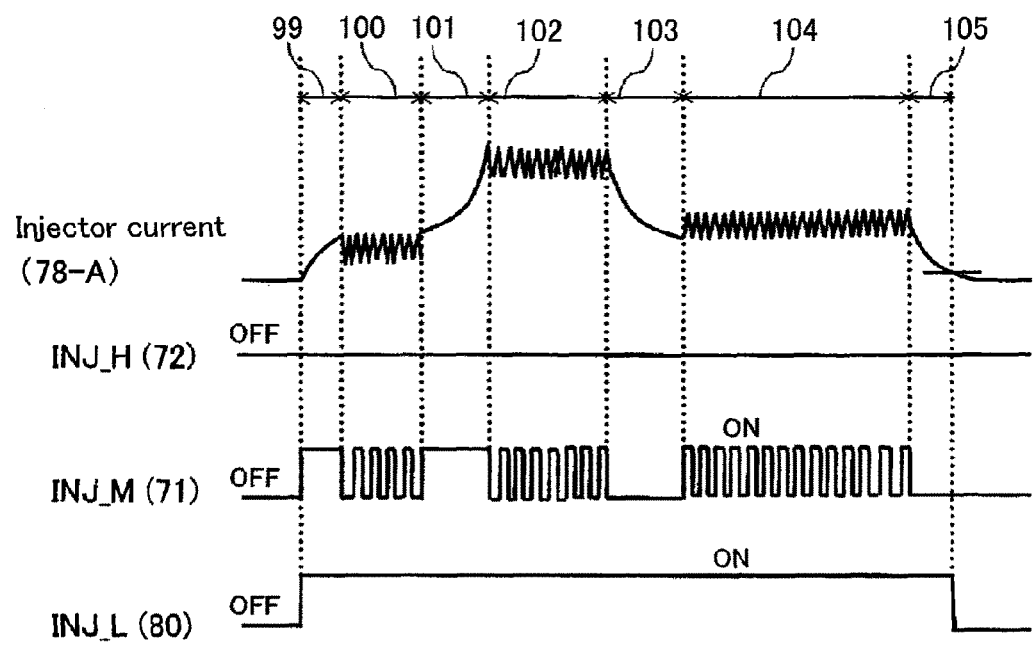
FIG. 13 is a diagram illustrating the input voltage waveform and the injector current waveform of a first cylinder during the failure of the boost circuit in the injector driving circuit (for one cylinder) according to Embodiment 3 of the present invention.

Since the current waveform shown at the first row of FIG. 11 is formed by making use of the boost circuit at the periods 85, 86, 88 and 90 shown in FIG. 11 in the case where the boost circuit has been gone out of order, it is no longer possible to create the current waveform of FIG. 11 due to this failure of the boost circuit. Therefore, the driving signals to be applied to the MOSFETs 72, 71 and 80 are changed to the waveforms shown at the second, the third and the fourth rows of FIG. 13, respectively. In this case, in different to the conventional circuit, since the power source to be supplied to the peak current MOSFET 72 and to the holding current MOSFET 71 is divided and the reverse current-preventing diodes 73 and 74 are additionally incorporated, it is possible, even if the boost circuit has gone out of order, to supply electric current from the power source to the holding current MOSFET 71, thereby making it possible to create the current waveform shown at the first row of FIG. 13. As a result, it is possible to flow electric current to the injector solenoid coil 78 and hence to actuate the injector.

Figure 14:
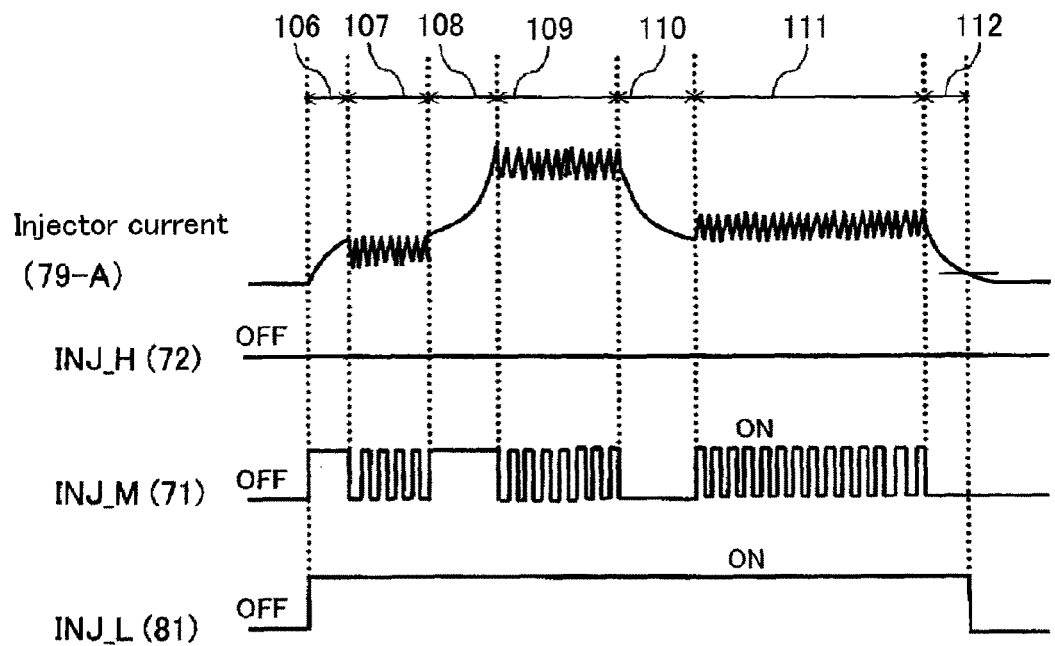
FIG. 14 is a diagram illustrating the input voltage waveform and the injector current waveform of a second cylinder during the failure of the boost circuit in the injector driving circuit (for one cylinder) according to Embodiment 3 of the present invention.

Further, since the current waveform shown at the first row of FIG. 12 is formed by making use of the boost circuit at the periods 93, 94, 96 and 98 shown in FIG. 12 in the case where the boost circuit has been gone out of order, it is no longer possible to create the current waveform of FIG. 12 due to this failure of the boost circuit. Therefore, the driving signals to be applied to the MOSFETs 72, 71 and 81 are changed to the waveforms shown at the second, the third and the fourth rows of FIG. 14, respectively. In this case, since electric current is enabled to be supplied from the power source to the holding current MOSFET 71 even if the boost circuit has gone out of order, it is possible to create the current waveform shown at the first row of FIG. 14. As a result, it is possible to flow electric current to the injector solenoid coil 79 and hence to actuate the injector.

Further, when both of the peak current MOSFET 72 and the holding current MOSFET 71 are turned OFF and either the downstream side MOSFET 80 or the downstream side MOSFET 81 is turned ON, the energy of electric current flowing to the injector solenoid coil 78 or 79 is enabled to be consumed by the flywheel diode 75, so that the boost circuit is no longer required to be used. Additionally, during the periods 103 and 105 shown in FIG. 13 as well as during the periods 110 and 112 shown in FIG. 14, the electric current flowing to the injector solenoid coil 78 or 79 is monitored, thereby enabling the downstream side MOSFET 80 or 81 to turn OFF at a threshold level immediately before the driving current falls to zero. In this manner, the regenerative current can be prevented from flowing toward the boost circuit.

However, since it is necessary to wait until a moment immediately before the falling of the driving current becomes zero, there is an increasing possibility that the falling to of the driving current may overlap with the rise of the counter cylinder. Therefore, in a situation where the preceding injector current transmitted at first is likely to overlap with the succeeding injector current transmitted subsequently, the priority should be given to the transmission of the succeeding injector current, so that even if the fall of driving current does not reach a threshold value at that point, the downstream side MOSFET 80 or 81 is actuated to turn OFF. By doing so, the aforementioned overlapping can be prevented. Further, since it is designed to generate a precharge current at the period 99 of FIG. 13 and the period 106 of FIG. 14 to thereby excite the injector, it is possible to promote the opening of the injector and to improve the minimum injection quantity.

The present invention is applicable not only to the injector solenoid coil of automobiles but also to any demand for fail-safe in every kinds of actuators which are designed to be actuated through the control of electric current by making use of a boost circuit.

What is claimed is:

1. A control unit for an internal combustion engine, which comprises a boost circuit, a switching element, a current detecting resistor and a controller and is designed to be actuated such that the boost circuit is used to boost a power source voltage to create a boosted voltage and the controller is used to control the switching element so as to enable the boosted voltage to flow to the injector solenoid coil;

wherein the control unit is characterized in that, when the boost circuit goes out of order, the injector solenoid coil is excited by making use of the power source voltage without using the boosted voltage and without creating a peak current to thereby generate a first holding current required for opening the injector and a second holding current required for retaining the opened state of the injector, the second holding current being lower in intensity than the first holding current.

2. The control unit according to claim 1, which further comprises: a current channel for enabling the boost circuit to communicate, via a switching element for peak current and a reverse current-preventing diode, with the injector solenoid coil; and a current channel, which is disposed parallel with the first-mentioned current channel, for enabling a power source to communicate, via a switching element for holding current and the reverse current-preventing diode, with the injector solenoid coil, thereby creating a current channel for enabling the power source voltage to be directly transmitted to the injector solenoid coil.

3. The control unit according to claim 2, which further comprises a downstream side switching element and the current detecting resistor which are successively disposed on the downstream side of the injector solenoid coil and a flywheel diode which is located between the downstream side of the current detecting resistor and the upstream side of the injector solenoid coil;

wherein the electric current flowing into the injector solenoid coil is monitored as the electric current falls by making use of the flywheel diode and the downstream side switching element is shut down at a threshold level of the electric current immediately before the fall of the electric current becomes zero.

4. A control unit for an internal combustion engine, which comprises a boost circuit, a switching element, a current detecting resistor and a controller and is designed to be actuated such that the boost circuit is used to boost a power source voltage to create a boosted voltage and the controller is used to control the switching element so as to enable the boosted voltage to flow to the injector solenoid coil;

wherein the control unit is characterized in that, when the boost circuit goes out of order, the injector solenoid coil is excited by making use of the power source voltage without using the boosted voltage and without creating a peak current to thereby generate a pre-charge current for promoting the opening of the injector, a first holding current required for opening the injector and a second holding current required for retaining the opened state of the injector, the second holding current being lower in intensity than the first holding current.

5. The control unit according to claim 4, which further comprises: a current channel for enabling the boost circuit to communicate, via a switching element for peak current and a reverse current-preventing diode, with the injector solenoid coil; and a current channel, which is disposed parallel with the first-mentioned current channel, for enabling a power source to communicate, via a switching element for holding current and the reverse current-preventing diode, with the injector solenoid coil, thereby creating a current channel for enabling the power source voltage to be directly transmitted to the injector solenoid coil.

6. The control unit according to claim 5, which further comprises a downstream side switching element and the current detecting resistor which are successively disposed on the downstream side of the injector solenoid coil and a flywheel diode which is located between the downstream side of the current detecting resistor and the upstream side of the injector solenoid coil;

wherein the electric current flowing into the injector solenoid coil is monitored as the electric current falls by making use of the flywheel diode and the downstream side switching element is shut down at a threshold level of the electric current immediately before the fall of the electric current becomes zero.

7. The control unit according claim 1, which is designed such that when a waiting time for the fall of electric current is prolonged, the downstream side switching element is shut down timely before the fall of electric current overlaps with the rise of electric current flowing into the injector solenoid coil of a counter cylinder.

* * * * *